(No Model.)
J. N. AKARMAN & F. LE NOIR.
TROLLEY WHEEL GUARD.
No. 507,641. Patented Oct. 31, 1893.
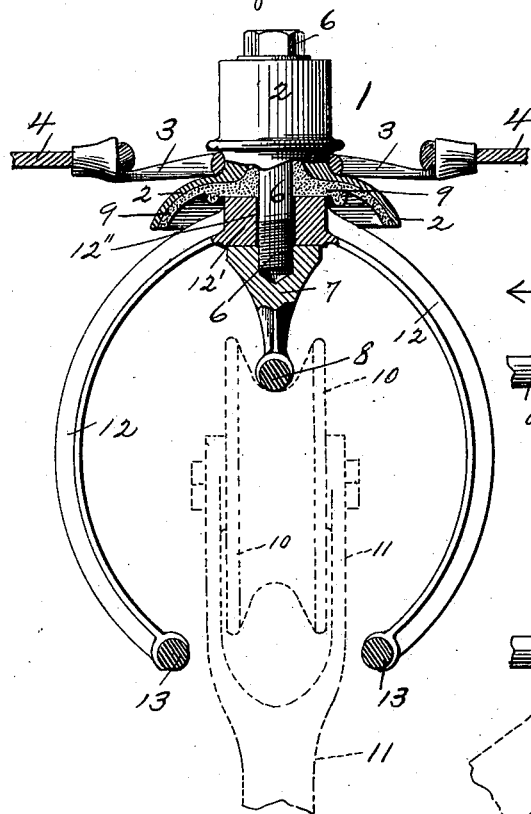
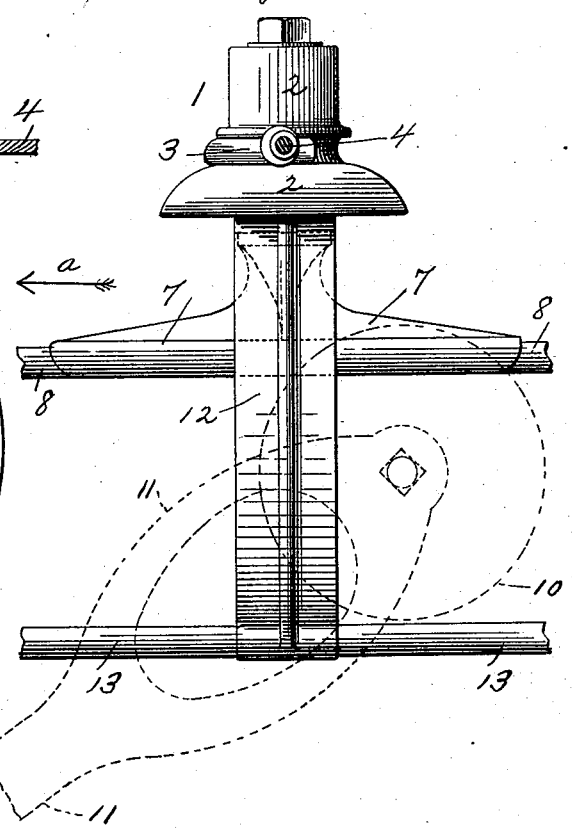
Fig. 3.
Witnesses
Chas. F. Schuch
Katie Farrell
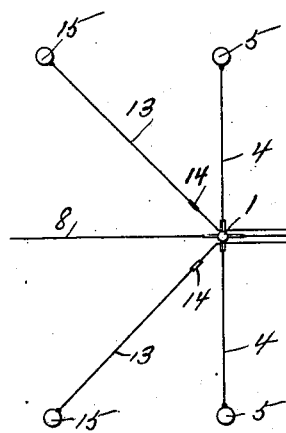
Inventors
John N. Akarman,
Frederick Le Noir,
By Attorney
John C. Dewey
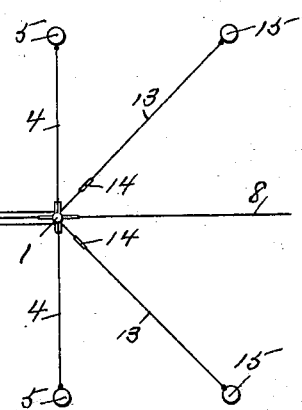

UNITED STATES PATENT OFFICE.

JOHN N. AKARMAN AND FREDERICK LE NOIR, OF WORCESTER, MASSACHUSETTS.

TROLLEY-WHEEL GUARD.

SPECIFICATION forming part of Letters Patent No. 507,641, dated October 31, 1893.

Application filed April 10, 1893. Serial No. 469,713. (No model.)

*To all whom it may concern:*

Be it known that we, JOHN N. AKARMAN and FREDERICK LE NOIR, citizens of the United States, residing at Worcester, in the county of Worcester and State of Massachusetts, have jointly invented certain new and useful Improvements in Trolley-Wheel Guards; and we do hereby declare that the following is a full, clear, and exact description thereof, which, in connection with the drawings making a part of this specification, will enable others skilled in the art to which our invention belongs to make and use the same.

Our invention relates to trolley wheel guards for overhead trolley wire electric railways, and the object of our invention is to provide a trolley wheel guard, of simple construction and operation, and preferably adapted to be combined with the hangers which support the trolley wire, to hold the trolley wheel on the trolley wire, and retain the trolley pole in its proper position under the trolley wire, and to return the trolley wheel to the trolley wire in case it is disengaged therefrom by the jar or motion of the car.

Our invention consists in certain novel features of construction of a trolley wheel guard, as will be hereinafter fully described.

In the operation of electric railways with overhead trolley wires, a single trolley wire extends over the center of the track, and the trolley wheel, mounted to revolve in the upper end of the trolley pole attached to the top of the car, is provided with a grooved face into which the trolley wire extends, as the trolley wheel travels under and in contact with the trolley wire to receive the electric current therefrom. The trolley wheel is kept in engagement with the trolley wire by a spring attached to the base of the trolley pole.

In the running of electric cars there is always considerable jar or motion of the car, and this is particuiarly the case in the crossing of steam railway tracks at grade, and in going around a curve. This jar or motion of the car is often sufficient to move the trolley pole, and cause the trolley wheel to be disengaged from the trolley wire, and the spring acting on the base of the trolley pole will cause the trolley wheel to pass up by the trolley wire, on one side or the other thereof, instead of engaging the trolley wire, and in order to make the trolley wheel again engage the trolley wire, the car attendant has to pull down the trolley pole by the rope connected therewith, and guide the same so that the trolley wheel will engage the trolley wire.

In crossing steam railway tracks at grade, it is very essential that the trolley wheel should not leave the trolley wire, and prevent the current passing from the trolley wire, to the trolley wheel and the trolley pole to operate the car, for if this should happen the car would be brought to a standstill on the tracks. It is also important in going around sharp curves at a considerable rate of speed that the trolley wheel should not leave the trolley wire, and also in going under bridges, for in this case if the trolley wheel flies off the trolley wire it will strike against the bridge structure and may break the trolley wheel or the trolley pole.

In our present invention, we provide a very simple, effective, and inexpensive mechanism, adapted to be combined and used in connection with the ordinary trolley wire hangers, and trolley wire, particularly at grade crossings of steam railroads, and on curves and under bridges, to hold the trolley wheel on the trolley wire, and in case of the disengagement of the trolley wheel to return the same automatically to the trolley wire.

Referring to the drawings:—Figure 1 is a front view, partially in section, of our trolley wheel guard mechanism, combined with a trolley wire hanger of ordinary construction. The trolley wheel and the upper part of the trolley pole are shown in dotted lines. Fig. 2 is an edge view of the parts shown in Fig. 1, looking in the direction of arrow *a*, same figure, and Fig. 3 is a diagrammatic view, to illustrate the application of our invention, combined with a trolley wire, trolley wire hangers, span wires, and supporting posts.

In the accompanying drawings, 1 is a trolley wire hanger of ordinary construction, consisting of the bell shaped portion 2, the outwardly extending arms 3 supported thereon, to which are secured the ends of the span wires 4, leading to the supporting posts 5, upon opposite sides or the street or road bed, see Fig. 3, and the central bolt 6, on the lower end of which is screwed the ear 7, to the lower end of which ear is secured the trolley wire 8, all in the usual way. Insulating material 9 extends within the lower flaring end of the bell portion 2, and prevents the electric current passing from the trolley wire to said bell portion, and through the arms 3 to the span wires 4, in the usual way. A grooved face trolley wheel 10, mounted to revolve in the upper end of the trolley pole 11, travels under and engages the trolley wire 8, and receives the current therefrom in the ordinary way.

We will now proceed to describe our improved trolley wheel guard mechanism shown in this instance combined with the trolley wire hanger of ordinary construction shown in the drawings.

It will be understood that our trolley wheel guard mechanism may be combined with any form of hanger if preferred, or may be suspended independently above the trolley wire.

The trolley wheel guard support 12, is preferably made of horseshoe shape, as shown in Fig. 1, with the lower ends curved inwardly, and with a space between said ends wide enough to allow of the free admission of the trolley wheel to engage the trolley wire, as shown in Fig. 1, but not wide enough to allow the trolley wheel to pass up by the trolley wire on either side thereof. The upper end of the support 12 is preferably provided with a circular, or hub portion 12', which in this instance is adapted to fit within the lower flaring end of the bell portion 2, and is provided with a central hole 12'' through which the bolt 6 extends. The support 12 is in this instance combined with the hanger 1 by inserting the bolt 6 through the hole 12'' in said support, and screwing the ear 7 on to the end of said bolt 6, as clearly shown in Fig. 1. In the lower ends of the support 12 are secured guard wires 13, or their equivalent, which are adapted to extend below the trolley wire 8, and at each side thereof, and also parallel thereto, and parallel to each other, as clearly shown in Fig. 3. The guard wires 13 may be live wires, the current passing from the trolley wire 8 through the ear 7 and support 12, to said wires, in which case the wires would be insulated at some point, as 14, Fig. 3, between the hangers 1 and supporting posts 15, to which the ends of said guard wires 13 are attached, as shown in Fig. 3. The guard wires 13 may be insulated from the trolley wire 8, so as not to be charged with the electric current, by means of non-conducting bushings supported in the lower ends of the support 12, or otherwise.

From the above description, in connection with the drawings, the operation of our trolley wheel guard mechanism will be readily understood by those skilled in the art. Where it is desired to provide the trolley wire with the trolley wheel guard, at grade crossings of steam railroads, or around sharp curves, or under bridges, or anywhere else, the supports 12 are preferably attached to the ordinary hangers which support the trolley wire, and the two guard wires are secured in the lower ends of said supports, and extend upon each side of the trolley wire, and in a plane below the same, and at such a distance apart as to allow of the free admission of the trolley wheel between said guard wires, which act to hold the trolley wheel on the trolley wire and to guide the trolley pole, so that in case of the trolley wheel jarring or flying off from the trolley wire, the same will be prevented from passing up by the trolley wire to either side thereof, and will be guided or directed by the guard wire 13 to again automatically engage the trolley wire. In case the guard wires 13 are live wires, the electric current will pass from said guard wires down the trolley pole when said pole is in engagement with either of said wires, and the trolley wheel is disengaged from the trolley wire, thus a continuous circuit for the electric current will be obtained when the trolley wheel is not in engagement with the trolley wire.

It will be understood that the details of construction of our trolley wheel guard mechanism may be varied somewhat if desired, and instead of employing wire to act as guard wires, wooden poles, or other material may be used.

Having thus described our invention, what we claim as new, and desire to secure by Letters Patent, is—

1. The herein described trolley wheel guard, consisting of a support, wires attached to said support, and extending below and upon each side of the trolley wire, and parallel thereto, for the purpose stated, substantially as set forth.

2. The herein described trolley wheel guard, consisting of a support, two wires secured to said support, and extending below and upon each side of the trolley wire, and parallel thereto, for the purpose stated, substantially as set forth.

3. The combination with hangers for supporting the trolley wire, and the trolley wire, of guard wires, extending below and at each side of the trolley wire, and parallel thereto, and means for supporting said guard wires, or guards, substantially as shown and described.

4. The combination with the trolley wire, of two guard wires, extending below the trolley wire, and upon each side thereof and parallel thereto, between which the upper end of the trolley pole is adapted to extend, for the purpose stated, and means for supporting said guard wires, or guards, substantially as shown and described.

5. The combination with the hangers which support the trolley wire, and the trolley wire, of two guard wires extending below and upon each side of the trolley wire, and parallel thereto, and means for supporting said guard wires, consisting of horseshoe shaped supports attached to the hangers, substantially as shown and described.

JOHN N. AKARMAN.
FREDERICK LE NOIR.

Wiinesses:
JOHN C. DEWEY,
KATIE FARRELL.